(No Model.) 2 Sheets—Sheet 1.
F. C. BEARDSLEY.
INCUBATOR.
No. 458,141. Patented Aug. 18, 1891.
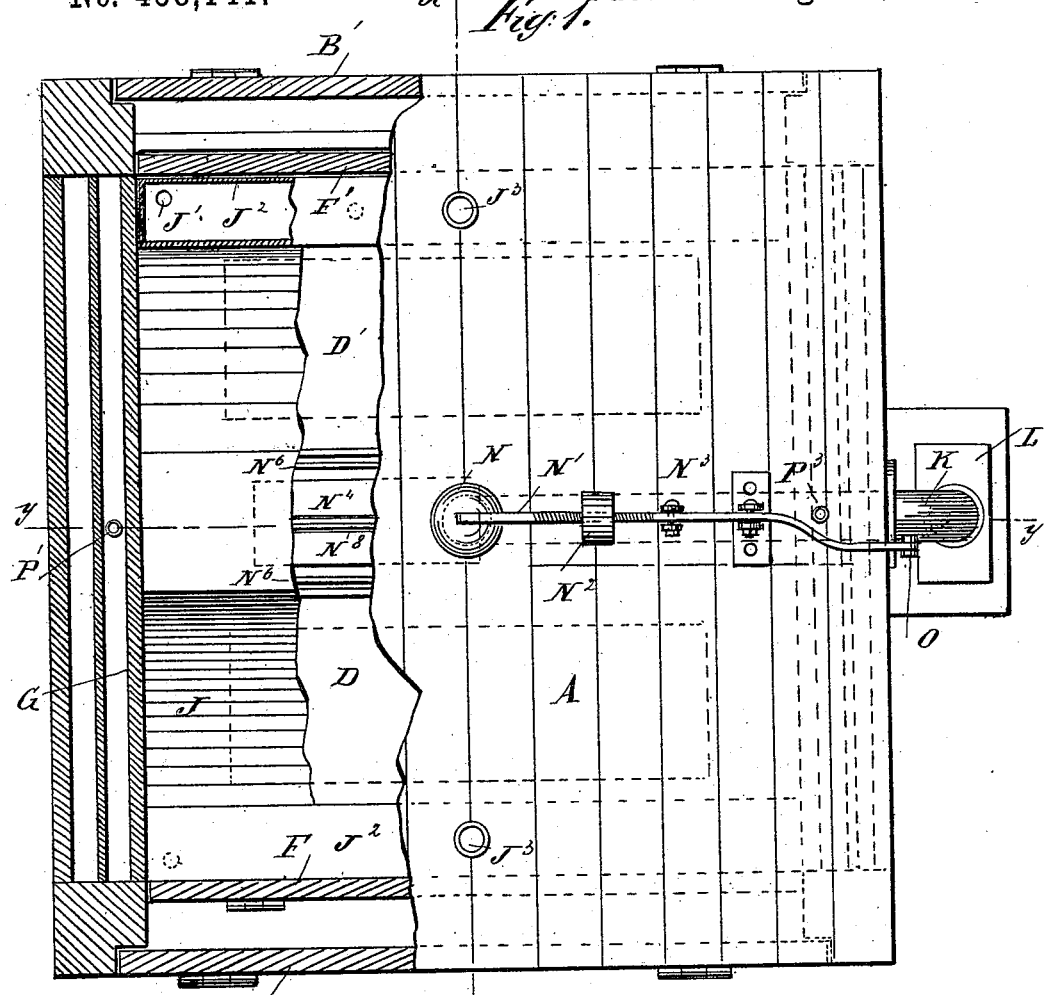
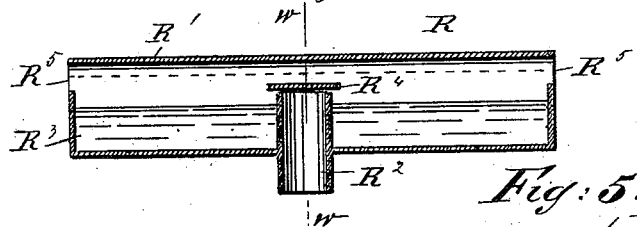
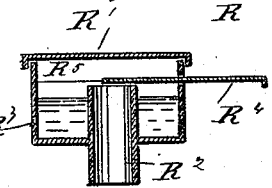
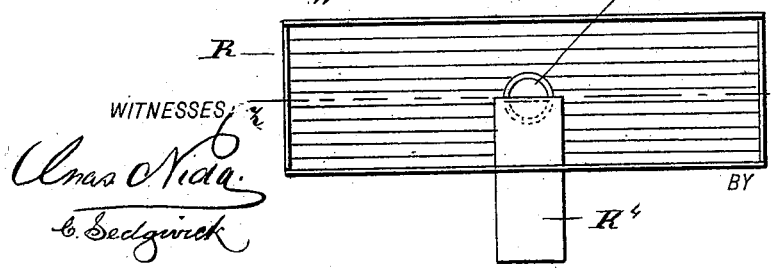
WITNESSES:
Amas Nida
C. Sedgwick
INVENTOR:
F. C. Beardsley
BY
Munn & Co
ATTORNEYS (No Model.) 2 Sheets—Sheet 2.
F. C. BEARDSLEY.
INCUBATOR.
No. 458,141. Patented Aug. 18, 1891.
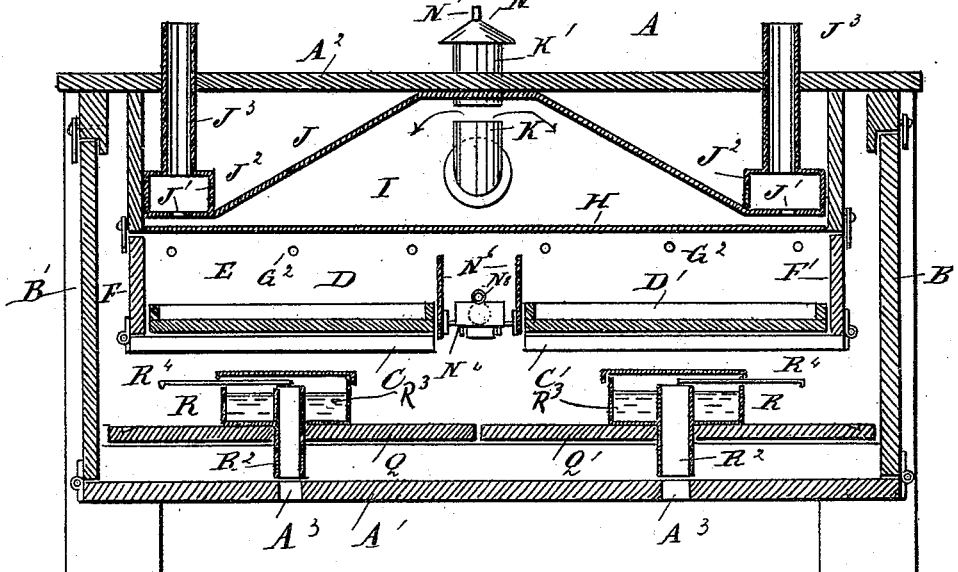
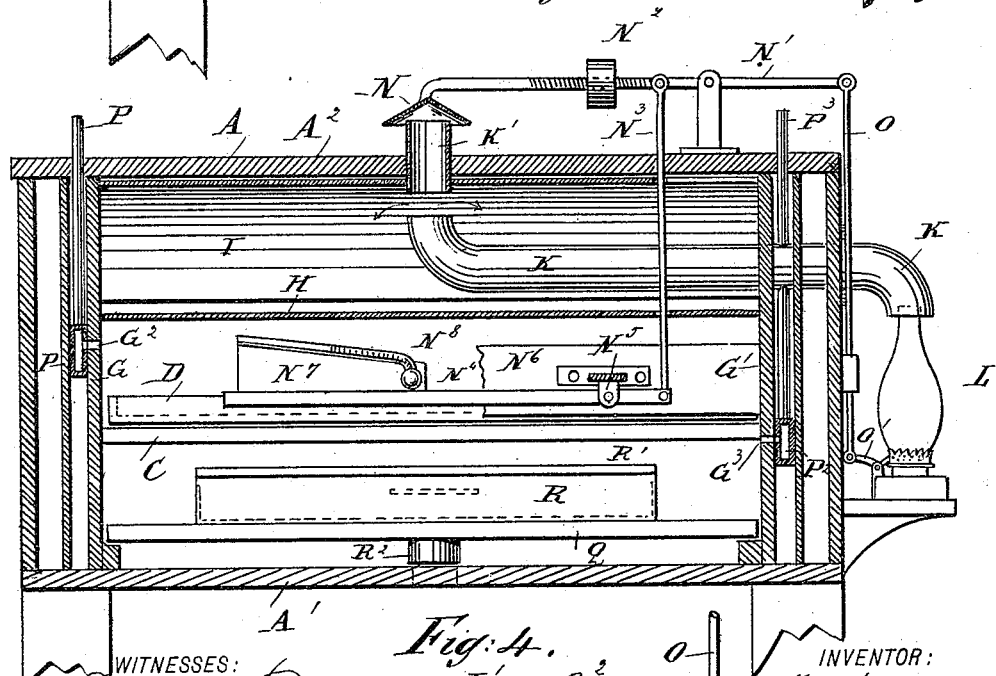
WITNESSES:
Chas. Nicks.
C. Sedgwick.
INVENTOR:
F. C. Beardsley
BY Munn & Co.
ATTORNEYS

UNITED STATES PATENT OFFICE.

FRANK C. BEARDSLEY, OF BILLERICA, MASSACHUSETTS, ASSIGNOR TO LESTER E. ROSS AND CHARLES E. SCOTT, OF SAME PLACE.

INCUBATOR.

SPECIFICATION forming part of Letters Patent No. 458,141, dated August 18, 1891.

Application filed March 6, 1890. Serial No. 342,862. (No model.)

*To all whom it may concern:*

Be it known that I, FRANK C. BEARDSLEY, of Billerica, in the county of Middlesex and State of Massachusetts, have invented a new and Improved Incubator, of which the following is a full, clear, and exact description.

The object of the invention is to provide a new and improved incubator which is simple and durable in construction, and in which the heat and moisture are effectively and equally distributed to insure a safe development of the embryos.

The invention consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a plan view of the improvement with parts broken out and parts in section. Fig. 2 is a sectional side elevation of the same on the line $x\ x$ of Fig. 1. Fig. 3 is a transverse section of the same on the line $y\ y$ of Fig. 1. Fig. 4 is an enlarged side elevation, with parts in section, of the lamp-regulating device. Fig. 5 is an enlarged plan view of one of the moisture-boxes, the cover being removed. Fig. 6 is a sectional side elevation of the same on the line $z\ z$ of Fig. 5, and Fig. 7 is a transverse section of the same on the line $w\ w$ of Fig. 6.

The improved incubator is provided with a suitably-constructed casing A, having at its ends the doors B and B', which when opened permit of inspecting the interior of the casing A and also of the removing or changing of the parts of the same as occasion may require.

Within the casing A and between the sides are arranged supports C and C', on which are set trays D and D', respectively, containing the eggs to be hatched. The trays D and D' form the bottom of a chamber E, adapted to be opened at its ends by doors F and F', located opposite the doors B and B', as is plainly shown in Fig. 2. The sides G and G' of this chamber E extend from the bottom A' to the top $A^2$ of the casing A, thus forming double sides of the casing A. (See Fig. 3.) The chamber E is closed by a top H of sheet metal, above which is formed the heating-chamber I, having a top J, which is inclined from the center to the sides, as is plainly shown in Fig. 2, so as to form a heating-chamber of nearly triangular form. Into this heating-chamber I opens a pipe K, extending to the outside of the casing A, over the top of the chimney of a lamp L of any approved construction, so that when the said lamp L is lighted the heat passes from its chimney into the pipe K and through the latter and out at the inner upwardly-bent end into the chamber I, so as to heat the chamber I. The top J of the chamber I is provided at the lowest point of each side with openings J', leading into longitudinally-extending channels $J^2$, each of which is provided at or near its middle with an upwardly-extending pipe $J^3$, passing through the top $A^2$ of the casing A, so that the downwardly-flowing heat and smoke from pipe K, after passing through the chamber I, can pass through the openings J' into the channels $J^2$, and from the latter through the pipes $J^3$ to the outside.

In line with and above the inner end of the pipe K is held the short pipe K', which extends through the top of the chamber I and the casing A, and is adapted to be closed or opened at its outer end by a cap N, secured on one end of a lever N', fulcrumed on the top $A^2$ of the casing and carrying an adjustable weight $N^2$ for counterbalancing the lever. The latter is pivotally connected with a link $N^3$, which extends through the top of the casing A and the chamber I into the chamber E, and is there pivotally connected with a lever $N^4$, held between the two trays D and D' and fulcrumed on a bracket $N^5$, secured on two boards $N^6$, running parallel between the trays D and D'.

On the free end of the lever $N^4$ is arranged the board $N^7$, supporting a thermometer $N^8$, having its bulb near the fulcrum of the lever $N^4$ and having its pipe extending in line with the lever $N^4$ and toward the rear end of the same. When the heat in the chamber E increases, the mercury in the thermometer will expand, so that part of the mercury will pass toward the free end of the lever N⁴, whereby the lever N⁴ will be set in motion, acting by its link N³ on the lever N', so that the cap N on the said lever swings upward, thus uncovering the upper end of the pipe K', whereby the smoke and heat of the pipe K will pass straight upward through the pipe K' to the outside, and but little heat passes into the chamber I until the heat in both chambers I and E is sufficiently reduced to bring the lever N⁴ back to its former position by the contraction of the mercury in the thermometer N⁸.

In the wall G is arranged a number of openings G², leading from the chamber E into the channel P, arranged on the outside of the wall G and having an upwardly-extending pipe P' passing through the top A² of the casing A to the outside. All air in the chamber E can thus pass through the openings G² into the channel P and from the latter by the pipe P' to the outside.

Below the chamber E is arranged a series of apertures G³ in the wall G', said apertures leading into a channel P², arranged similarly to the channel P and also provided with an upwardly-extending pipe P³, leading to the outside of the casing A.

Below the trays D and D' are arranged the moisture-boxes R, set on removable bottoms Q and Q', resting on suitable cleats on the sides of the casing A and adapted to be removed when the doors B and B' are opened. Each of the moisture-boxes R is provided with a covering R', and in the center of each box is arranged a tube R², which extends within the box above the level of the water R³ held in the box, while the lower end of the pipe R² extends down over an opening A³, formed in the bottom A' of the casing A, so that air from the outside can pass through the opening A³ into the pipe R², and from the latter into the box R over the water R³ held in the said box. The damper R⁴ is adapted to slide in one of the sides of the box R over the upper end of the pipe R², so that the amount of air permitted to pass from the outside into the box R can be regulated.

In each end of the box R are arranged openings R⁵ to permit the moisture to pass from the box into the casing A in the chamber underneath the trays D and D'.

At the end of the lever N' opposite the cap N is pivotally connected a link O, extending along one side of the casing A and pivotally connected at its lower end with a lever O', fulcrumed on the lamp L and carrying a square frame O², adapted to pass over the wick-holder of the lamp to regulate the flame of the lamp according to the heat inside of the chamber E.

The operation is as follows: When the trays D and D', filled with eggs, are in place within the casing A and the chamber E and the operator lights the lamp L, then the heat passes from the lamp through the pipe K into the chamber I, thus heating the said chamber I, which by its metallic bottom forms the top of the chamber E and heats the latter from above, so that the eggs in the trays D and D' are hatched. The necessary moisture is introduced into the chamber E by the moisture-boxes R, and the amount of moisture can be regulated by adjusting dampers R⁴ over the pipes R², introducing air from the outside to the moisture-boxes, so that the outer air passes over the evaporating-liquid in the boxes and out through the openings R⁵ into the chamber E. The used air in the latter passes through the openings G² to the channel P, and through the latter by the pipe P' to the outside. Surplus moisture can pass out through openings G³ into the channel P², and from the latter by the pipe P³ to the outside. When the temperature in the chamber E rises above a certain degree, then the mercury in the thermometer N⁸ acts on the lever N⁴, as previously described, so that the lever N' is set in motion, whereby the cap N swings away from the upper end of the pipe K', and at the same time the flame of the lamp L is reduced by the frame O², the lever O', and the link O, connected with the said lever N'. The weight N² on the lever N' serves to counterbalance the said lever and the parts connected with it. By adjusting the weight N² the cap N can be set relative to the pipe K', so as to close the latter sooner or later when the heat increases within the chamber E. When the doors B and B' of the casing A are opened, the operator can conveniently remove the moisture-boxes R by sliding out the bottoms Q and Q', on which the moisture-boxes are fastened. Said boxes can then be refilled and put back in their places. When the operator opens the doors B and B' and opens the doors F and F', also, he can conveniently slide the trays D and D' out or examine the contents of the same, as desired.

Having thus fully described my invention, I claim as new and desire to secure by Letters Patent—

1. In an incubator, the combination, with a hatching-chamber containing trays, of a heating-chamber having a metallic bottom and arranged over the said hatching-chamber, a heating-pipe discharging into the said heating-chamber to heat the latter, moisture-boxes arranged below the trays in the said hatching-chamber, a pipe extending into each of the said moisture-boxes and connected with the outer air, and a damper held on each of the said air-pipes to regulate the inlet of the air, substantially as shown and described.

2. The moisture-box for an incubator, which consists of the box proper, a lid therefor, an air-pipe passing through and extending above the bottom of the box and rigidly connected with it, and a sliding damper arranged to cover the mouth of said pipe and projecting from the side of the box, as shown and described.

3. In an incubator, the combination, with a hatching-chamber, of moisture-boxes set below the said chamber, and channels arranged on the outside of the said hatching-chamber and opening in the latter below the egg-trays to carry off surplus moisture, substantially as shown and described.

FRANK C. BEARDSLEY.

Witnesses:
  JOS. S. HOLT,
  WALTER J. HUTCHINS.